United States Patent [19]

Ham et al.

[11] Patent Number: 5,716,279

[45] Date of Patent: Feb. 10, 1998

[54] APPARATUS AND METHOD FOR COUPLING AN OUTPUT SHAFT OF A MOTOR TO A SECONDARY SHAFT

[75] Inventors: Craig A. Ham, Miamisburg; Ralph J. Unterborn, Dayton, both of Ohio

[73] Assignee: ITT Automotive Electrical Systems, Inc., Auburn Hills, Mich.

[21] Appl. No.: 560,192

[22] Filed: Nov. 21, 1995

[51] Int. Cl.⁶ .................................................... F16D 3/18
[52] U.S. Cl. .................................................... 464/159
[58] Field of Search ................................ 464/157, 158, 464/159, 89, 92, 147, 151; 403/123, 130, 133

[56] References Cited

U.S. PATENT DOCUMENTS

| Re. 34,667 | 7/1994 | Neumann | 310/216 |
|---|---|---|---|
| 1,940,884 | 12/1933 | Rosenberg | 464/89 |
| 2,854,829 | 10/1958 | Porter | 464/159 |
| 2,975,649 | 3/1961 | Propst . | |
| 2,984,995 | 5/1961 | Kalen | 464/159 |
| 3,068,713 | 12/1962 | Davis . | |
| 3,068,714 | 12/1962 | Davis . | |
| 3,302,477 | 2/1967 | Grabowski . | |
| 3,333,484 | 8/1967 | Young . | |
| 3,359,757 | 12/1967 | Adams | 464/159 |
| 3,937,097 | 2/1976 | Fund et al. . | |
| 3,940,946 | 3/1976 | Anderson | 464/89 |
| 4,080,079 | 3/1978 | Waara | 464/158 X |
| 4,258,584 | 3/1981 | Haegele et al. | 74/424.8 R |
| 4,274,268 | 6/1981 | Taig | 464/152 X |
| 4,464,141 | 8/1984 | Brown | 464/89 X |
| 4,824,418 | 4/1989 | Taubert | 464/159 |
| 4,887,480 | 12/1989 | Pollo | 74/459 |
| 4,972,113 | 11/1990 | Newberg | 310/217 |
| 5,007,880 | 4/1991 | Walker | 464/159 |
| 5,008,572 | 4/1991 | Marshall et al. | 310/45 |
| 5,010,266 | 4/1991 | Uchida | 310/156 |
| 5,068,556 | 11/1991 | Lykes et al. | 310/90 |
| 5,068,557 | 11/1991 | Murugan | 310/90 |
| 5,087,847 | 2/1992 | Giesbert et al. | 310/90 |
| 5,088,362 | 2/1992 | Schalles | 82/142 |
| 5,128,571 | 7/1992 | Itsu | 310/67 R |
| 5,296,773 | 3/1994 | El-Antably et al. | 310/261 |
| 5,321,328 | 6/1994 | Ide | 310/90 |
| 5,357,160 | 10/1994 | Kaneda et al. | 310/67 R |
| 5,394,043 | 2/1995 | Hsia | 310/90 |

FOREIGN PATENT DOCUMENTS

| 2616018 | 10/1977 | Germany | 464/159 |
|---|---|---|---|
| 40-4175514 | 6/1992 | Japan | 464/159 |
| 856451 | 12/1960 | United Kingdom | 403/130 |

*Primary Examiner*—Eileen A. Dunn
*Attorney, Agent, or Firm*—Thomas N. Twomey; J. Gordon Lewis

[57] ABSTRACT

A motor assembly includes an output shaft having a first central axis, the output shaft including a first coupling member. The motor assembly further includes a secondary shaft having a second central axis, the secondary shaft including a second coupling member which is coupled to the first coupling member, wherein the first central axis and the second central axis are non-colinear when the first coupling member is coupled to the second coupling member during operation of the motor. A method of coupling an output shaft of a motor to a secondary shaft is also disclosed.

10 Claims, 4 Drawing Sheets

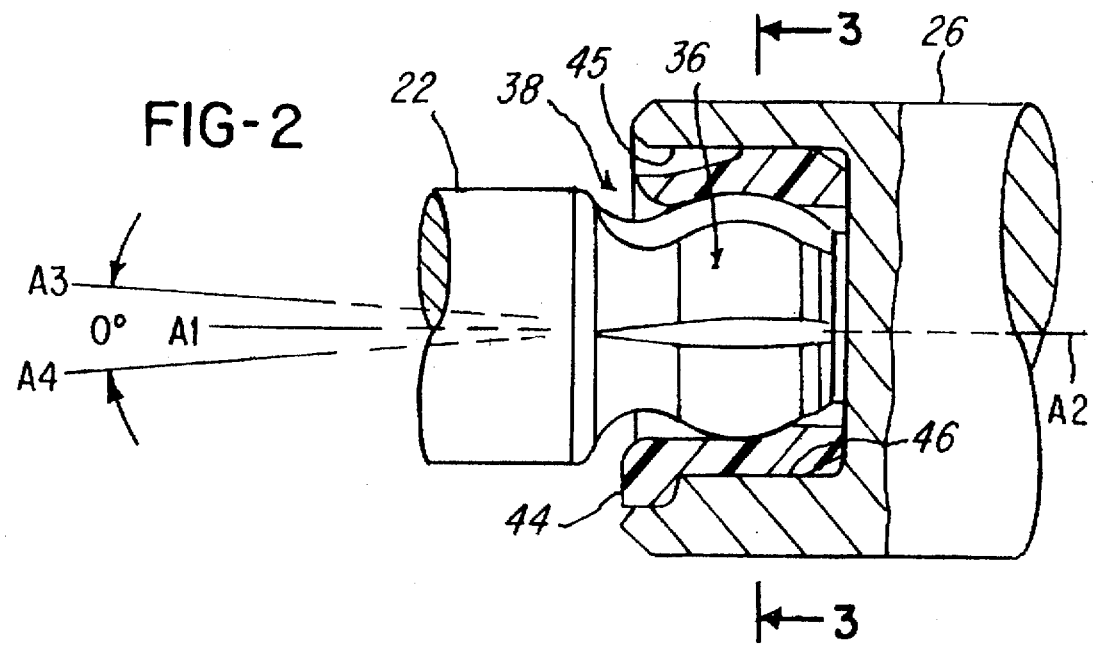
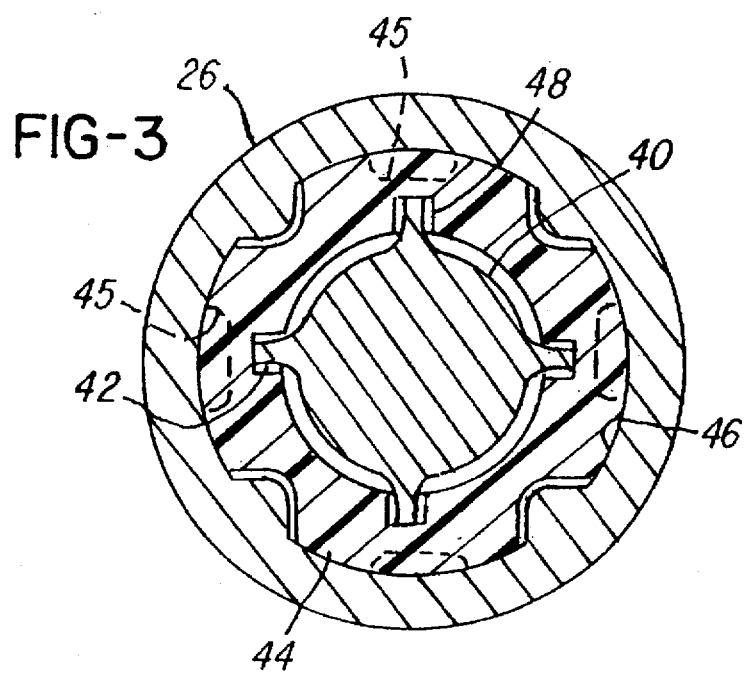

APPARATUS AND METHOD FOR COUPLING AN OUTPUT SHAFT OF A MOTOR TO A SECONDARY SHAFT

BACKGROUND OF THE INVENTION

The present invention generally relates to the coupling of two shafts, and more particularly relates to an apparatus and method for coupling an output shaft of a motor to a secondary shaft.

Motors are used to drive various mechanical mechanisms. For example, in the automobile industry, motors provide the force needed to raise and lower automobile windows and door locks.

In order to transmit force generated by a motor to a desired destination so as to act upon an operative part, such as a window or door lock, intermediate mechanisms such as shafts and gears are mechanically interposed between an output shaft of the motor and the operative part. These intermediate mechanisms must be mechanically coupled to the output shaft of the motor in some manner.

In one motor assembly design, the output shaft of a motor includes a shaft portion which extends a distance beyond the end of the motor case. The shaft portion has a worm gear defined therein. The worm gear meshes with a secondary gear to transfer force from the worm gear to the secondary gear during operation of the motor.

A first prior art approach to supporting the worm gear in operative relationship to the secondary gear in the above motor assembly design is to provide two bearings as follows. A first bearing supports the output shaft within the motor case at a first end portion of the motor case. A second bearing supports the output shaft within the motor case at a second end portion of the motor case. A portion of the output shaft in which the worm gear is defined is cantilevered into operative relationship with the secondary gear. In this first approach, the worm gear tends to bend away from the secondary gear during operation of the motor especially under high load conditions thus causing the teeth of the worm gear to separate from the teeth of the secondary gear. Consequently, damage to the worm gear and secondary gear results.

A second prior art approach to supporting the worm gear in operative relationship to the secondary gear in the above motor assembly design is to provide three bearings as follows. A first bearing supports the output shaft within the motor case at a first end portion of the motor case. A second bearing supports the output shaft within the motor case at a second end portion of the motor case. A third bearing supports the output shaft outside of the motor case at an end portion of the output shaft which is located near the worm gear. However, when a single solid motor shaft is supported by three bearings as described above, binding of the shaft with at least one of the bearings tends to occur during operation of the motor due to misalignment of the three bearings with the motor shaft. This binding causes reduced performance and possibly failure of the above system.

It would therefore be desirable to provide a motor assembly wherein the worm gear did not tend to bend away from the secondary gear during operation of the motor especially under high load conditions.

It would further be desirable to provide a motor assembly having at least three bearings which supports a motor output shaft wherein the bearings supporting the output shaft do not have to be accurately aligned.

SUMMARY OF THE INVENTION

In accordance with one embodiment of the present invention, there is provided a method of coupling an output shaft of a motor to a secondary shaft, with the output shaft having a first central axis and the secondary shaft having a second central axis. The method includes the steps of (1) providing the output shaft with a first coupling member, (2) providing the secondary shaft with a second coupling member, and (3) coupling the first coupling member to the second coupling member so that the first central axis and the second central axis are non-colinear during operation of the motor.

Pursuant to another embodiment of the present invention, there is provided a motor assembly which includes an output shaft having a first central axis, the output shaft including a first coupling member. The motor assembly further includes a secondary shaft having a second central axis, the secondary shaft including a second coupling member which is coupled to the first coupling member, wherein the first central axis and the second central axis are non-colinear when the first coupling member is coupled to the second coupling member during operation of the motor.

It is therefore an object of the present invention to provide a new and useful method of coupling an output shaft of a motor to a secondary shaft.

It is another object of the present invention to provide an improved method of coupling an output shaft of a motor to a secondary shaft.

It is therefore an object of the present invention to provide a new and useful motor assembly.

It is another object of the present invention to provide an improved motor assembly.

It is moreover an object of the present invention to provide a motor assembly wherein a worm gear does not tend to bend away from a secondary gear during operation of the motor especially under high load conditions.

It is still another object of the present invention to provide a motor assembly having at least three bearings which support a motor output shaft wherein the bearings supporting the output shaft do not have to be accurately aligned.

The above and other objects, features, and advantages of the present invention will become apparent from the following description and attached drawings.

BRIEF DESCRIPTION OF THE DRAWINGS

FIG. 2 is a fragmentary side elevational view of the output shaft coupled to the secondary shaft of the motor assembly of FIG. 1, with a portion of the secondary shaft shown removed for clarity of description;

FIG. 3 is a sectional view taken in the direction 3—3 of FIG. 2;

DETAILED DESCRIPTION OF THE PREFERRED EMBODIMENT

Figure 1:
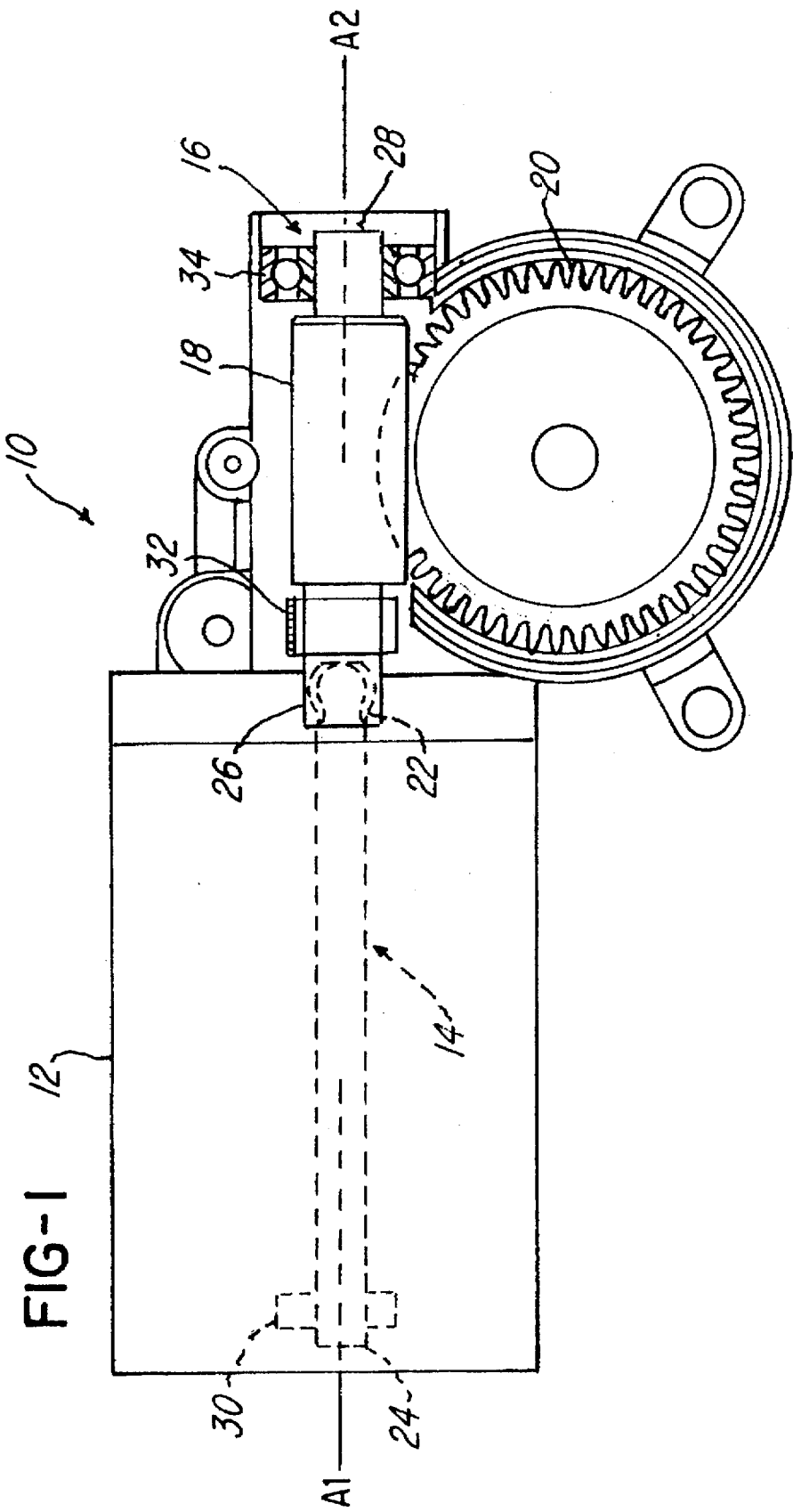
FIG. 1 is a side elevational view of a motor assembly which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring to FIG. 1, there is shown a motor assembly 10 which incorporates the features of the present invention therein. The motor assembly 10 includes a motor 12 having an output shaft 14. The output shaft 14 has a central axis A1. The output shaft 14 is made from a carbon steel material. The output shaft 14 is an armature shaft which is caused to rotate about the central axis A1 during operation of the motor 12.

The motor assembly 10 further includes a secondary shaft 16. The secondary shaft 16 has a central axis A2. The secondary shaft 16 is made from a carbon steel material. The secondary shaft 16 includes a worm gear 18 (schematically shown in FIG. 1). The worm gear 18 meshes with a secondary gear 20 to transfer force from the worm gear 18 to the secondary gear 20 during operation of the motor 12. The secondary gear 20 is coupled to a mechanical system (not shown) which ultimately is used to raise and lower a window in an automobile.

The output shaft 14 includes a first end portion 22 and a second end portion 24. The secondary shaft 16 includes a first end portion 26 and a second end portion 28.

The motor assembly 10 further includes a first bearing 30, a second bearing 32 and a third bearing 34. The first bearing 30 supports the second end portion 24 of the output shaft 14, while the second bearing 32 supports the first end portion 26 of the secondary shaft 16. The third bearing 34 supports the second end portion 28 of the secondary shaft 16.

Turning now to FIG. 2, there is shown the first end portion 22 of the output shaft 14 is shown coupled to the first end portion 26 of the secondary shaft 16. The first end portion 22 of the output shaft 14 includes a first coupling member 36. The first end portion 26 of the secondary shaft 16 includes a second coupling member 38 which mates with the first coupling member 36.

Figure 4:
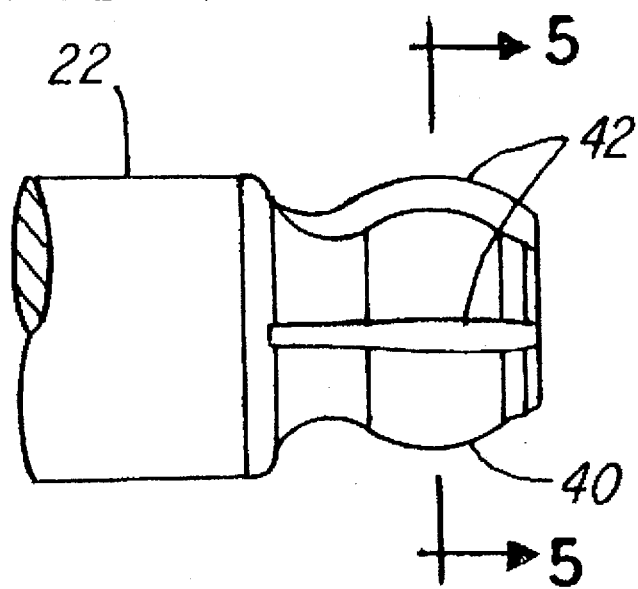
FIG. 4 is a fragmentary view of the output shaft of FIG. 1.
Figure 5:
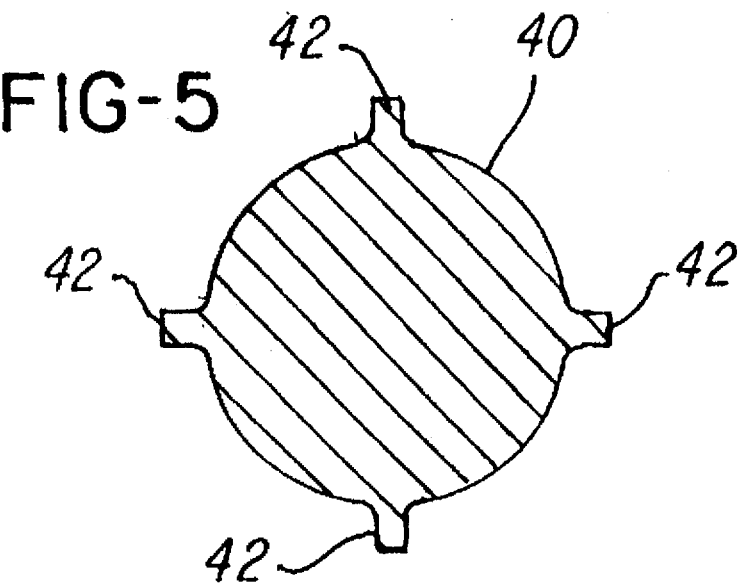
FIG. 5 is a sectional view taken in the direction of 5—5 of FIG. 4.

The first coupling member 36 includes a ball member 40 with a plurality of flutes 42 attached thereto (see FIGS. 4 and 5). The second coupling member 38 includes a socket member 44 which is friction fit into a recess 46 defined in the first end portion 26 of the secondary shaft 16 (see FIGS. 2, 3 and 6). Defined within the socket member 44 is a plurality of voids 45. The voids 45 enable socket member 44 to temporarily deform during insertion of the socket member 44 into recess 46. The socket member 44 is made from a plastic material such as an acetal resin material. One acetal resin material which may be used is Derlin which is a trademark of E. I. duPont De Nemours & Co., Inc. of Wilmington, Del.

Figure 6:
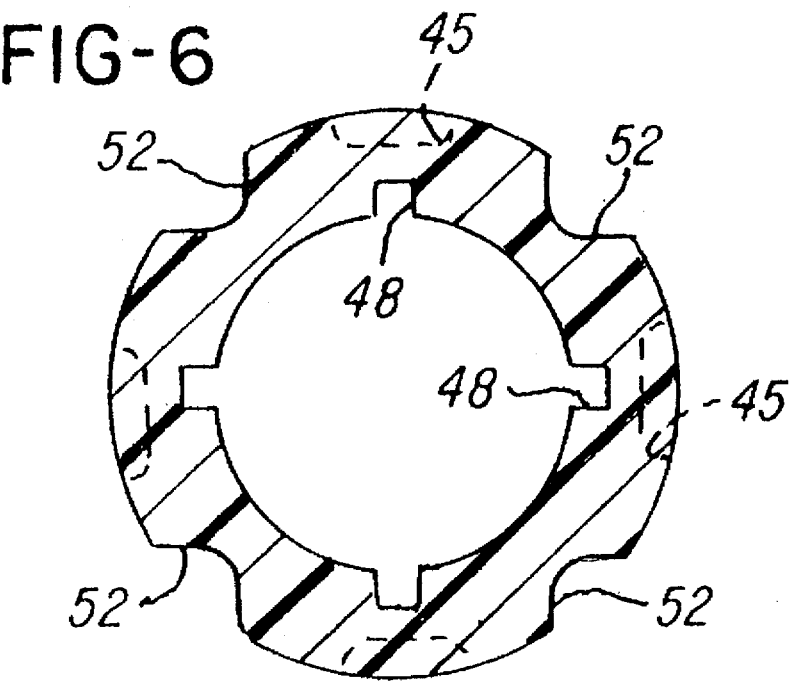
FIG. 6 is a sectional view of the socket member of FIG. 3.

As can be seen in FIGS. 3 and 6, the socket member 44 includes a plurality of internal grooves 48 defined therein which receive the plurality of flutes 42. The flutes 42 rotate as output shaft 14 rotates during operation of the motor 12. Since the flutes 42 are positioned in the grooves 48 during coupling of the first coupling member 36 with the second coupling member 38, rotation of flutes 42 causes socket member 44 to rotate, which in turn causes secondary shaft 16 to rotate.

Figure 7:
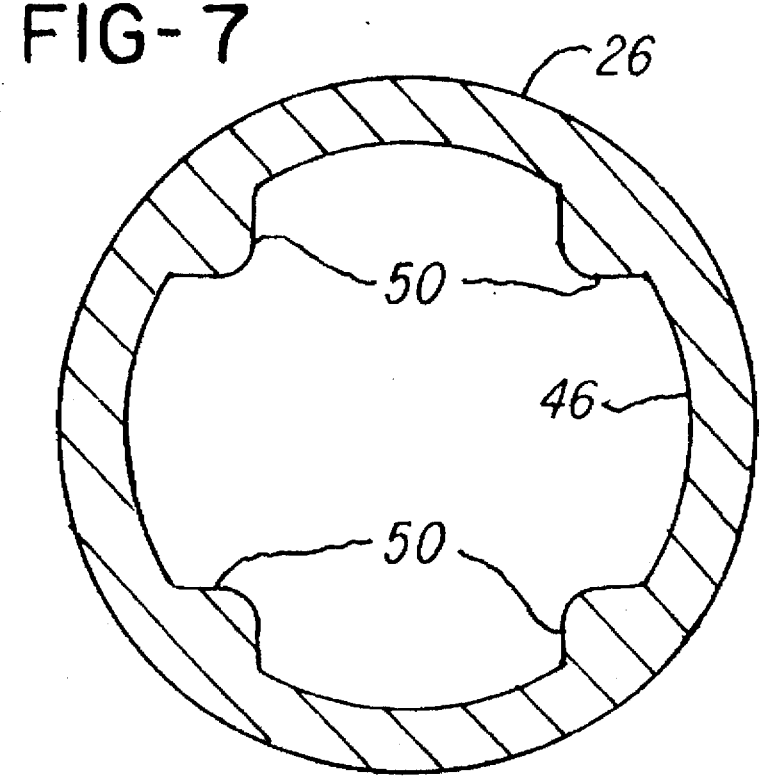
FIG. 7 is a sectional view of the output shaft of FIG. 3.

As shown in FIGS. 3 and 7, the secondary shaft 16 includes a plurality of internal drive flutes 50 positioned within the recess 46. The internal drive flutes 50 cooperate with a plurality of external drive lugs 52 which are defined in the outer periphery of the socket member 44. Due to the cooperation of the internal drive flutes 50 with the external drive lugs 52, rotation of socket member 44 causes rotation of secondary shaft 16 without relative slippage occurring therebetween.

Turning again to FIG. 2, when the first coupling member 36 is coupled to the second coupling member 38, it is not necessary that the first central axis A1 remain colinear with second central axis A2 for proper operation of the motor assembly 10. This is true since the coupling which occurs between the first coupling member 36 and the second coupling member 38 enables pivoting between the output shaft 12 and secondary shaft 14.

In particular, the output shaft 14 may be pivoted such that the central axis of the output shaft may take the position A3 at one extreme and the position A4 at another extreme as shown in FIG. 2. The total pivot of the output shaft 14 relative to second shaft 16 is $\theta$ where $\theta$ equals approximately $8°$. When the central axis of output shaft 14 is located at either position A3 or A4, it is non-colinear relative to the central axis A2 of the secondary shaft 16.

The ability of the output shaft 14 to be coupled to the secondary shaft 16 such that the central axis of each of the shafts 14, 16 are non-colinear relative to each other reduces the risk that misalignment of the three bearings 30, 32 and 34 would cause binding during operation of the motor 12.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

What is claimed is:

1. A method of coupling an output shaft of a motor to a secondary shaft, with the output shaft having a first central axis and the secondary shaft having a second central axis, comprising the steps of:

providing the output shaft with a first coupling member;

providing the secondary shaft with a second coupling member;

coupling the first coupling member to the second coupling member so that the first central axis and the second central axis are non-colinear during operation of the motor, wherein:

the output shaft of the motor has a first end portion and a second end portion, the secondary shaft has a first end portion and a second end portion, the first coupling member is positioned at the first end portion of the output shaft, the second coupling member is positioned at the first end portion of the secondary shaft, and further comprising the steps of:

supporting the second end portion of the output shaft of the motor with a first bearing;

supporting the first end portion of the secondary shaft with a second bearing;

supporting the second end portion of the secondary shaft with a third bearing;

wherein the secondary shaft includes a recess defined therein, and the second coupling member includes a socket member which is positioned within the recess.

2. The method of 1, wherein:

the secondary shaft includes an internal drive member positioned within the recess, and the socket member includes an external drive lug which cooperates with the internal drive member.

3. The method of claim 1, wherein the output shaft includes a ball member which is positioned within the socket member.

4. The method of claim 3, wherein:

the ball member includes a plurality of flutes, the socket member includes a plurality of grooves, and the plurality of flutes are positioned within the plurality of grooves.

5. The method of claim 1, wherein the socket member has a plurality of voids defined therein, and further comprising the step of temporarily deforming the socket member during insertion of the socket member into the recess.

6. A motor assembly, comprising:

an output shaft having a first central axis, said output shaft including a first coupling member;

a secondary shaft having a second central axis, said secondary shaft including a second coupling member which is coupled to the first coupling member, wherein the first central axis and the second central axis are non-colinear when the first coupling member is coupled to the second coupling member during operation of the motor, wherein:

the output shaft has a first end portion and a second end portion, the secondary shaft has a first end portion and a second end portion, the first coupling member is positioned at the first end portion of the output shaft, the second coupling member is positioned at the first end portion of the secondary shaft, and further comprising:

a first bearing which supports the second end portion of the output shaft;

a second bearing which supports the first end portion of the secondary shaft;

a third bearing which supports the second end portion of the secondary shaft;

wherein the secondary shaft includes a recess defined therein, and the second coupling member includes a socket member which is positioned within the recess.

7. The motor assembly of 6, wherein:

the secondary shaft includes an internal drive member positioned within the recess, and the socket member includes an external drive lug which cooperates with the internal drive member.

8. The motor assembly of claim 6, wherein the output shaft includes a ball member which is positioned within the socket member.

9. The motor assembly of claim 8, wherein:

the ball member includes a plurality of flutes, the socket member includes a plurality of grooves, and the plurality of flutes are positioned within the plurality of grooves.

10. The motor assembly of claim 6, wherein the socket member has a plurality of voids defined therein which facilitates deformation of the socket member during insertion of the socket member into the recess.

* * * * *